United States Patent

[11] 3,623,653

[72] Inventor William Anthony Work
 Coon Rapids, Minn.
[21] Appl. No. 69,543
[22] Filed Sept. 4, 1970
[45] Patented Nov. 30, 1971
[73] Assignee American Can Company
 New York, N.Y.
 Original application Sept. 25, 1968, Ser. No. 762,501, now Patent No. 3,536,501, dated Oct. 27, 1970. Divided and this application Sept. 4, 1970, Ser. No. 69,543

[54] FOOD PACKAGE CONSTRUCTION
 3 Claims, 5 Drawing Figs.
[52] U.S. Cl. .................................. 229/87 F,
 206/46 F, 229/51 WB
[51] Int. Cl. .................................. B65b 25/06
[50] Field of Search .......................... 229/87 F,
 51 WB, 51 ST; 206/46 F; 99/171 LP, 178

[56] References Cited
UNITED STATES PATENTS
2,954,116  9/1960  Maso ...................... 229/51 WB X Primary Examiner—Donald F. Norton
Attorneys—Robert P. Auber, George P. Ziehmer, Ronald A. Schapira and Leonard R. Kohan ABSTRACT: A construction for a food package consisting of two laminate members. Each laminate member consists of an inner layer, disposed adjacent to the food product, and an outer layer bonded to the inner layer. The inner layers are heat sealed together to enclose the food product in the laminate members. The bonds and tensile strengths of the layers are such that pulling the laminate members apart to open the package results in a delamination of one of the laminate members and the tearing of its inner layer to provide access to the food product.

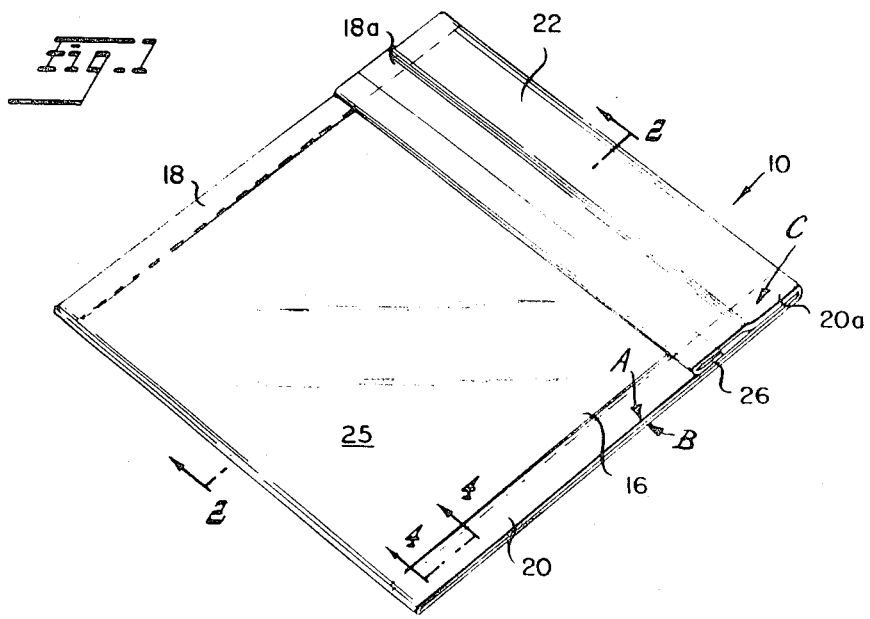
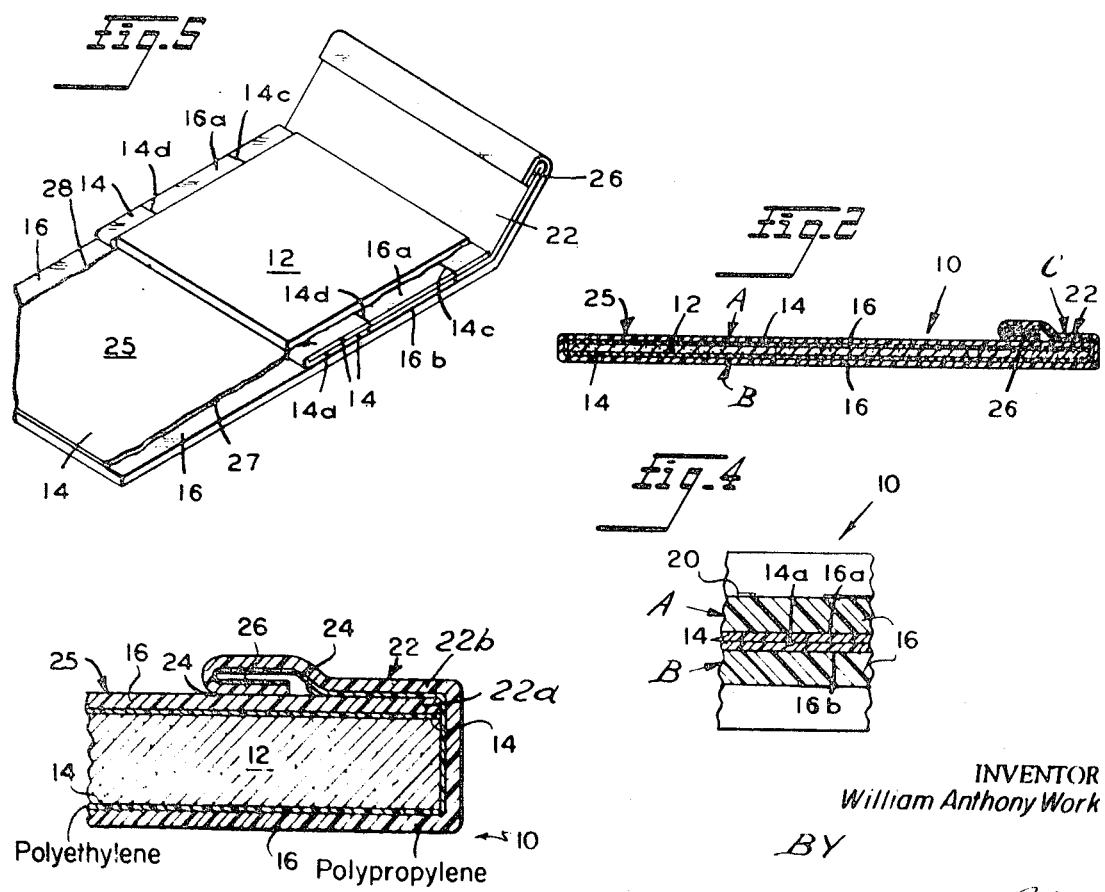
INVENTOR
William Anthony Work
BY
Ronald A. Schapira
ATTORNEY

FOOD PACKAGE CONSTRUCTION

CROSS-REFERENCES TO RELATED APPLICATIONS

This application is a division of my copending application, Ser. No. 762,501, now Pat. No. 3,536,501 entitled Food Package and Method of Making Same.

BACKGROUND OF THE INVENTION

This invention relates to the packaging of food products and, more particularly, to the packaging of such food products so as to prevent a loss of moisture content therefrom. The invention also relates to a package of novel construction which provides for effective sealing of food products and which is easily opened to provide for convenient access to the food product.

Heretofore it has been customary to wrap individually sliced food products, such as individual slices of cheese, by wrapping them in a plastic material, such as cellophane. However, it has been observed that this material absorbs moisture from the product which results not only in a loss of net weight for the slices as packaged but also in an overly dry taste and texture and a deterioration in flavor. Where cheese is concerned, certain manufacturers have attempted to overcome these deleterious effects by adding an extra amount of cheese to each slice. While this procedure helps to maintain the net weight as posted on the label despite the loss of moisture, it is obviously uneconomical and does not prevent deterioration of quality caused by the dryness.

Accordingly, it is a primary purpose of the present invention to provide an inexpensive, moistureproof package for individually sliced food products wherein the food products are enclosed within a sheet material such as shown in U.S. Pat. No. 3,285,497. The sheet material comprises a laminate having a first layer of plastic which is capable of being heat sealed to itself and a second layer intimately laminated throughout to the first layer with the second layer being relatively nonabsorbent and moisture impermeable to food products. In addition, the second layer has a higher melting point than the first layer so that heat may be passed through the second layers to seal the first layers together. The individually sliced food product is wrapped in the flexible wrapping material with the ends of the wrapping material overlapped. The wrapping material is sufficiently wide to provide overhanging lateral portions which are fin sealed in conventional manner by the application of heat and pressure. The second layer has a low adhesive affinity for the first layer whereby easy access to the package may be had along a line of separation beneath the overlapped ends of the wrapping material.

In specific embodiments of the foregoing invention, the first layer is preferably made from polyethylene and the second layer is preferably made from polypropylene with the polypropylene layer being from one to three times as thick as the polyethylene layer. As an optional feature, the terminal portion of the overlapped end of the wrapping material may be folded under so as to provide means to grasp an end of the package material when it is desired to open the package.

SUMMARY OF THE INVENTION

In order to provide a package which provides effective sealing of food contents and which is easily opened to provide access to the food contents, as set forth in the Background of the Invention, this invention, briefly summarized, relates to a package construction wherein the bond between the heat sealed, first layers of the laminate sheet material is stronger than the bond between the second and first layers of the laminate sheet material; wherein the bond between the second layer and the first layer of the laminate sheet material is stronger than the tensile strength of the first layer; and wherein the tensile strength of the second layer is stronger than the bond between the first and second layers of the laminate sheet material.

BRIEF DESCRIPTION OF THE DRAWING

FIG. 1 is a perspective view of a package made in accordance with the present invention;

FIG. 2 is a side elevation view taken in vertical cross section along line 2—2 of FIG. 1;

FIG. 3 is a fragmentary side elevation view in vertical cross section showing a portion of FIG. 2 drawing to an enlarged scale;

FIG. 4 is a fragmentary side elevation view in vertical cross section taken along line 4—4 of FIG. 1 and drawn to an enlarged scale; and FIG. 5 is a perspective view of the package of FIG. 1 after it has been opened.

DESCRIPTION OF THE PREFERRED EMBODIMENT

While the various features of this invention are hereinafter illustrated and described with respect to a cheese product and more particularly to individual slices of cheese, it is to be understood that the various features of this invention can be utilized singly or in various combinations thereof with other food products and with food products in forms other than individual slices. Therefore, this invention is not to be limited merely to the embodiments illustrated in the drawings because the drawings are utilized herein merely to illustrate one of a wide variety of uses of this invention.

Referring now to FIGS. 1 and 2 of the drawing, there is illustrated a wrapped package, generally designated 10. A food product 12, such as an individual slice of cheese, is contained within the package 10. A flexible wrapping material 25 is wrapped completely around the food product 12 beginning at the top thereof and proceeding to envelope the entire slice of cheese.

The wrapping material consists of a first layer of plastic film 14 which contacts the top and bottom of the food product 12 and which is capable of being heat sealed to itself. Such a material may be polyethylene, for example. A second layer of plastic material 16, such as polypropylene, is intimately laminated throughout its surface area to the first layer 14 of polyethylene. The second layer of plastic material 16 not only provides the nonabsorbent and moisture impermeable qualities to the wrapping material but also has a low adhesive affinity for the first layer of plastic material.

The flexible laminated wrapping material has a width sufficient to provide overhanging portions on opposed sides of the sliced food product 12 whereby the overhanging portions may be fin sealed at 18 and 20. In addition, the wrapping material has a length sufficient to provide an overlapped portion 22 whereby the overhanging portions of the underlying end portion 22a and the overlying end portion 22b of the overlapped end portion 22 of the wrapping material may simultaneously be tightly closed but not sealed at 18a and 20a when the fin seals 18 and 20 are made. This tight closing without sealing allows for easy opening of the overlapped portion in a manner which will be hereinafter more fully described.

As best shown in FIG. 4, the fin 20 is sealed at the interface between the first layers 14. The second layer 16 has a relatively low adhesive affinity for the first layer and thus, the layers 14,16 may be separated or delaminated from each other at interfaces 16a or 16b.

This delamination at interfaces 16a or 16b provides for easy opening of the package. As shown in FIG. 5, the delamination may take place at interface 16a. The delamination is accompanied by longitudinal tearing of the first layer 14 along lines 27 and 28. It is to be understood that delamination may occur at both interfaces 16a and 16b in which event the first layer would tear laterally along lines 14c and 14d (FIG. 5) which would occur in a random manner.

The package of the present invention includes a wrapping material having nonabsorbent and moisture impermeable qualities. Moreover, the wrapper is constructed so as to be opened easily.

As an optional feature, the terminal portion of the overlapped portion 22 may be provided with a folded under edge 26 so as to facilitate an easy grasp of the edge of the overlapped portion 22 of the packaging material.

While the invention and many of its attendant advantages will be apparent from the foregoing description, a review of the method steps practiced in manufacturing the package will effectively summarize the features of this invention. An individual sliced food product, such as a slice of cheese, is wrapped in the flexible wrapping material which has a sufficient length to provide an overlapped end condition and which is sufficiently wide to provide overhanging lateral portions. As an optional step, the terminal end of the overlapped portion may be folded under to provide an easy access to the package. The overhanging lateral portions are then fin sealed at 18 and 20 and are tightly closed at 18a and 20a thereby obtaining an effectively sealed food product. Because the outer layer 16 has a low adhesive affinity for the inner layer 14, the line of separation 24 beneath the overlapped portion 22 provides an easy access to the package 10 when the folded under portion 26 is grasped and pulled to the right in FIG. 3.

According to the principles of the present invention, as just exemplified by the package 10 and its sealed fin 20, a construction for a food package is shown in FIGS. 4 and 5 which comprises two laminate members A and B and means C for pulling the laminate members apart to open the construction by delamination and tearing of one of the laminate members A,B. Each laminate member A,B consists of the first or inner layer 14 bonded to the second or outer layer 16. The inner layers 14 are heat sealed together along the confronting peripheral margin portions 18,20 of the laminate members A,B to enclose the food product within the laminate members. The underlying end portion 22a of one laminate member, the overlying end portion 22B of the other laminate member, and their associated line of separation 24 constitute means C for pulling the laminate members apart to open the construction by delamination of one of the laminate members A,B along the confronting margin portions 18,20.

The process of delamination to open the construction involves pulling the laminate members A,B apart to initially cause one of the laminate members to delaminate in the confronting margin portions 18,20 of the one-laminate member with the other laminate member. The one-laminate member tends to delaminate because the bond between its inner and outer layers 14,16 is not as strong as the tensile strength of its outer layer 16 or as the heat sealed bond between the inner layers 14 of the laminate members A,B. As shown in FIG. 5, laminate member A is the laminate member which delaminates. Thus, opening of the construction of the subject invention is initiated by delamination at interface 16a or 16b rather than by tearing of the outer layer 16 or the unbonding of the inner layers 14.

Delamination is accompanied by longitudinal tearing of the inner layer 14 of the one-laminate member along lines 27 and 28. While pulling of the laminate members A,B continues, the inner layer 14 tends to tear because its tensile strength is less than the tensile strength of the bond between the inner and outer layers 14,16 of the one laminate member. As shown in FIG. 5, the inner layer 14 of laminate member A tears. Thus, opening of the construction of the subject invention is accompanied by longitudinal tearing of the inner layer 14 of the one-laminate member rather than by continued delamination of the one-laminate member, beyond the confronting margin portions 18,20 of the one-laminate member.

In the manufacture of the wrapping material 25, it is preferred to add a slip-enhancing material to the polypropylene layer 16. This may be accomplished conveniently by the application of a light starch dust to the polypropylene layer 16 after it emerges from the conventional casting roll while en route to final rewinding. One suitable material is Oxy-Dry No. 644 which is an industrial food grade starch marketed by Oxy-Dry Spray Corp. of Chicago, Illinois.

The wrapping material 25 may be made in various thicknesses. Preferably, the wrapper is 1.25 mils (0.00125 inches) in total caliper, comprising 1.05 mils polypropylene and 0.20 mils polyethylene. The polyethylene layer may vary from 0.1 to 0.5 mils. The foregoing are preferred ranges of thickness and other may be selected so to achieve maximum economy without sacrificing the nonabsorbent, water impermeable and easy opening qualities of the wrapper.

In the process for making the film, the components are extruded simultaneously through a slot die extruder. The resins are actually united in the die which has a manifold permitting the components to develop their respective layers. The percentage of the layers is controlled principally by adjustment of manifolds within the die and controlling the amount of resin pumped into the die. While it is desirable to use as much of a percentage of polyethylene as possible because of its lower cost, in all instances to date the film has consisted of polypropylene having a thickness from one to six times the thickness of polyethylene.

It is to be understood that the foregoing sheet material construction may be a substrate portion of a lamination including layers of other material which have protective properties for packaging food or other products. Such other material may include polyvinylchloride, Saran, Mylar, nylon and the like. Such layer materials may be combined in known manners according to the protective properties desired. The sheet material of the present invention would provide protective properties and an easy opening feature to such laminations.

It is thought that the invention and many of its attendant advantages will be understood from the foregoing description, and it will be apparent that various changes may be made in the form, construction and arrangement of the parts without departing from the spirit and scope of the invention, the form hereinbefore described being merely a preferred embodiment thereof.

I claim:

1. In a package, for a product comprising a first laminate member having a first outer layer, intimately bonded to a first inner layer; a second laminate member having a second outer layer, intimately bonded to a second inner layer; said first and second inner layers being heat sealed together along the confronting peripheral margin portions of said laminate members to enclose said product within said laminate members; and means for pulling said laminate members apart to open said package by delamination of said first laminate member, the improvement comprising:

the bond between said inner layers being stronger than the bond between said first outer layer and said first inner layer;

the bond between said first, outer layer and said first inner layer being stronger than the tensile strength of said first inner layer; and the tensile strength of said first outer layer being stronger than the bond between said first outer layer and said first inner layer so that as said laminate members are pulled apart, said first outer and said first inner layers will initially unbond in the confronting peripheral margin portions of said first outer layer with said second outer layer where said inner layers are bonded and so that said first inner layer will tear to open the package as the pulling apart of said laminate members continues beyond the unbonding of said first outer and said first inner layers in said confronting peripheral margin portions of said outer layers.

2. The package of claim A wherein said first outer layer and said first inner layer are coextruded as a laminate web.

3. The package of claim A wherein said first outer layer is polypropylene; said first inner layer is polyethylene; and said first outer layer is from one to six times as thick as said first inner layer.

* * * * *